United States Patent [19]

Satoh et al.

[11] Patent Number: 4,939,713
[45] Date of Patent: Jul. 3, 1990

[54] ERASABLE OPTICAL DISK AND OPTICAL INFORMATION RECORDING/REPRODUCTION APPARATUS

[75] Inventors: Isao Satoh, Neyagawa; Makoto Ichinose, Sakai; Yoshihisa Fukushima, Osaka; Yuzuru Kuroki, Toyonaka, all of Japan

[73] Assignee: Matsushita Electric Industrial Co., Ltd., Osaka, Japan

[21] Appl. No.: 159,743

[22] Filed: Feb. 24, 1988

[30] Foreign Application Priority Data

Feb. 27, 1987 [JP] Japan .................. 62-45555
Mar. 6, 1987 [JP] Japan .................. 62-52533

[51] Int. Cl.$^5$ .................. G11B 11/10; G11B 5/02
[52] U.S. Cl. .................. 369/44.11; 369/100; 369/111; 369/124; 369/44.21
[58] Field of Search .................. 369/44, 46, 45, 111, 369/100, 124

[56] References Cited

U.S. PATENT DOCUMENTS

| | | | |
|---|---|---|---|
| 4,561,084 | 12/1985 | Gerard et al. | 369/46 |
| 4,622,564 | 11/1986 | Kaku et al. | 346/160 |
| 4,679,184 | 7/1987 | Yoshida et al. | 369/112 |
| 4,700,336 | 10/1987 | Yoshida et al. | 369/44 |
| 4,727,528 | 2/1988 | Wyland | 369/44 |
| 4,771,415 | 9/1988 | Taki | 369/46 |
| 4,849,953 | 7/1989 | Nomura et al. | 369/46 |

FOREIGN PATENT DOCUMENTS

61-198453 9/1986 Japan .

Primary Examiner—Steven L. Stephan
Attorney, Agent, or Firm—Stevens, Davis, Miller & Mosher

[57] ABSTRACT

This invention provides an erasable optical disk, on which information is recorded and reproduced repeatedly through the irradiation of laser beams, and an optical information recording/reproduction apparatus which records and reproduces information on the erasable optical disk. In erasing and then recording information on the erasable optical disk by using an erasing laser beam and a recording/reproduction laser beam, respectively, the tracking of both laser beams on the same track is detected so as to prevent erroneous erasing. The apparatus uses the optical disk having a mark signal disposed between a sector identifier and a data field, which mark signal is capable of determining the presence of the erasing laser beam on an adjacent track on the erasable optical disk, and the apparatus reproduces and detects the mark signal by using the erasing laser beam. The apparatus discriminates the position of the erasing laser beam depending on whether the mark signal has been detected or not, thereby preventing erroneous erasing of data on the adjacent track and simultaneously assuring the presence of the erasing laser beam on the same track along with the recording/reproduction laser beam.

6 Claims, 6 Drawing Sheets

← DISK ROTATIONAL DIRECTION

FIG. 7

ERASABLE OPTICAL DISK AND OPTICAL INFORMATION RECORDING/REPRODUCTION APPARATUS

BACKGROUND OF THE INVENTION

1. Field of the Invention

This invention relates to an optical disk and optical information recording/reproduction apparatus, and particularly to an erasable optical disk on which information is recorded, reproduced and erased repeatedly through irradiation of a laser beam, and to an optical information recording/reproduction apparatus which records and reproduces information on the erasable optical disk.

2. Description of the Related Art

Figure 8:
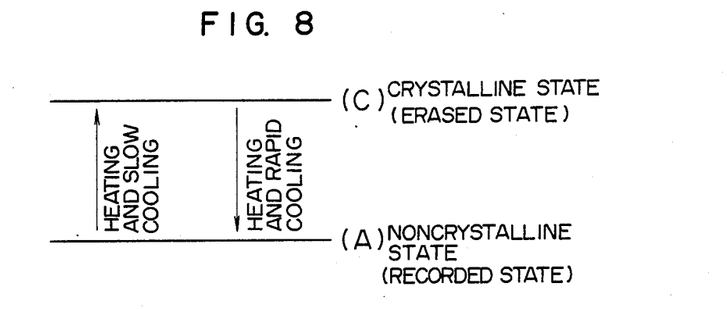
FIG. 8 is a diagram illustrating the phase variation between the noncrystalline state (A) and the crystalline state (C) of a phase varying recording medium.

FIG. 8 shows, as an example, the phase transition between the noncrystalline state (A) and the crystalline state (C) of a phase varying recording medium on a conventional optical disk. The recording medium records a signal by a variation between the noncrystalline state (A) of a small reflectivity and the crystalline state (C) of a large reflectivity. A signal is recorded in such a way that a portion of the recording medium in the crystalline state (C) having a large reflectivity is heated locally to a temperature near the fusing point and then cooled quickly to bring it into the noncrystalline state (A) having a small reflectivity. The recorded signal is erased by heating the recording medium to a temperature near the fusing point and then cooling it slowly so that the portion irradiated by the laser beam is brought into the crystalline state (C) having a large reflectivity.

Figure 9A:
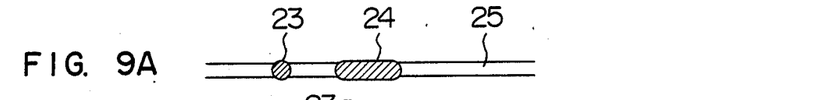
FIGS. 9A and 9B are diagrams illustrating the principle of erasing and recording of information.
Figure 9B:
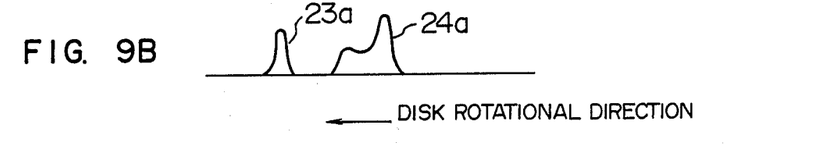

FIGS. 9A and 9B are diagrams illustrating the principle of signal recording and erasing by using a recording-/reproduction laser beam and an erasing laser beam. FIG. 9A shows the spot shape of laser beams for realizing the heating and rapid cooling condition and the heating and slow cooling condition for the recording medium. FIG. 9B shows the respective laser intensity distributions. In these figures, indicated by 23 is a spot of a recording/reproduction laser beam of a short longitudinal length of the order of 1 μm, 23a is its laser intensity distribution, 24 is a spot of an erasing laser beam of a long longitudinal length in the range from several μm to ten-odd μm, and 24a is its laser intensity distribution. Indicated by 25 is a guide track on which the recording medium is deposited by evaporation. Depending on the differences in the laser spot longitudinal length and intensity distribution, the two distinct heating and cooling conditions are determined, i.e., the short longitudinal length beam spot determines the heating and rapid cooling condition, and the long longitudinal length beam spot determines the heating and slow cooling condition.

In operation, the erasing laser beam 24, which precedes the recording/reproduction laser beam 23 irradiates the information section on the guide track 25 with a constant intensity so that an old signal recorded in the information section is erased and then the following recording/reproduction laser beam 23 records a new signal in the information section.

With the above-mentioned structure, however, it is necessary that the recording/reproduction laser beam 23 and the erasing laser beam 24 are positioned on the same guide track 25. In a two-beam optical information recording/reproducing apparatus generally in use, two separate semiconductor laser sources are used to produce two respective laser beams 23 and 24 which are arranged as shown in FIG. 9A. Hence, it is difficult to maintain both laser beam spots 23 and 24 positioned on the same guide track only by the precision of mechanical structure. Accordingly, it becomes necessary to apply tracking servo control to the erasing laser beam 24 in the same way as the recording/reproduction laser beam 23. However, even when the tracking servo control is applied to the erasing laser beam 24, the tracking actuator provides a movable range of 2-3 μm in the disk radial direction. Therefore, even when the tracking servo system is in operation, it is not guaranteed that the erasing laser beam 24 tracks the same guide track 25 in the same way as the recording/reproduction laser beam 23. On this account, there has been a problem that the erasing laser beam erroneously erases the record on an adjacent track. Besides, the same problem has been the case where the laser beam brings about track jump due to the vibration or shock.

SUMMARY OF THE INVENTION

Accordingly, it is an object of this invention to provide an optical disk and optical information recording-/reproduction apparatus capable of detecting and assuring that the recording/reproduction light beam and the erasing light beam are positioned on the same guide track and causing the erasing and recording operation to be stopped immediately when it is determined that both beams are not on the same track.

This invention relates to an optical disk having a sector identifier which records sector address information, a data field in which information is recorded and a mark signal disposed between the sector identifier and the data field for identifying that the erasing light beam is positioned on an adjacent track, and also relates to an optical information recording/reproduction apparatus comprising means for sequentially projecting an erasing light beam and a recording/reproduction light beam, recording and reproducing means for recording and reproducing information by using the recording/reproduction light beam, erasing means for erasing recorded information by using the erasing light beam, and mark signal detecting means for reproducing and detecting a mark signal by using the erasing beam.

With the optical disk of this invention, it is possible to detect the mark signal by using the erasing light beam and to determine that the erasing light beam is positioned on the same track along with the recording/reproduction light beam, and with the optical information recording/reproduction apparatus of this invention, it is possible to determine the position of the erasing light beam according to the detection or nondetection of the mark signal by the mark signal detecting means, whereby it is made possible to prevent erroneous erasure of data on an adjacent track and to guarantee that the erasing light beam and the recording/reproduction light beam are positioned on the same track.

DESCRIPTION OF THE PREFERRED EMBODIMENTS

Figures 1A, 1B:
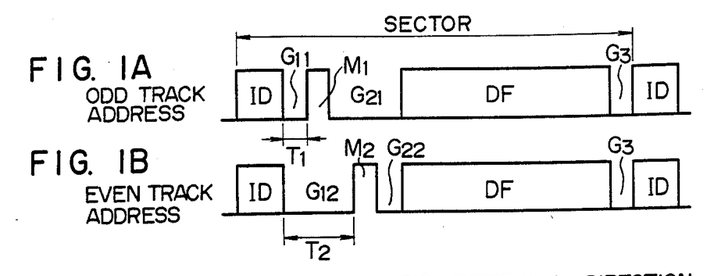
FIGS. 1A and 1B are diagrams showing the sector format of the optical disk embodying the present invention.

FIG. 1A shows the sector format for odd-numbered track addresses, and FIG. 1B shows the sector format for even-numbered track addresses. In the figures, indicated by ID is a sector identifier which is a record of sector address information, DF denotes a data field in which data is recorded, M1 and M2 are mark signals indicative of an even or odd track address as detected by an erasing beam, G11 and G12 are gaps having respective different lengths T1 and T2 for identifying the mark signals M1 and M2, and G21, G22 and G3 are gaps for absorbing a transient response time of the laser beam output and a variation of the disk rotational speed.

Figures 2A, 2B:
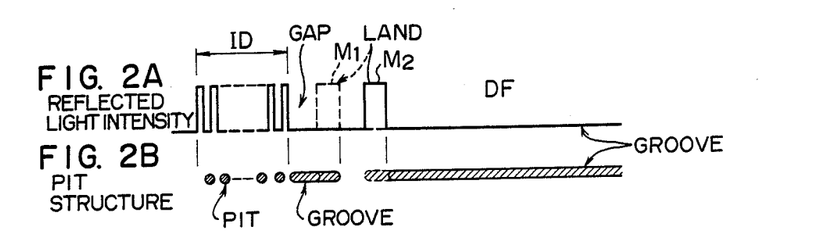
FIGS. 2A, 2B and 2C are diagrams illustrating an embodiment of the mark signals M1 and M2 shown in FIGS. 1A and 1B.
Figure 2C:
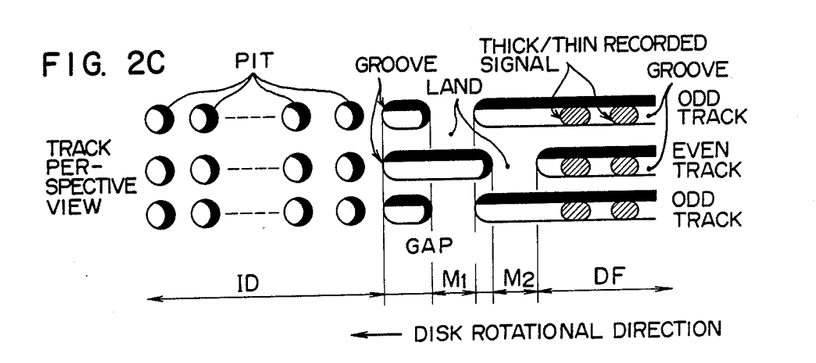

FIGS. 2A, 2B and 2C show the concrete structure of the mark signals M1 and M2 shown in FIG. 1. FIG. 2A is a diagram showing the intensity of the laser beam reflected from the track, FIG. 2B is a plan view of pits and grooves which give rise to changes in the reflected laser intensity as shown in FIG. 2A, and FIG. 2C is a perspective view of the track. The sector identifier ID is formed in the shape of pits having a constant depth, whereby address information is modulated and recorded. The mark signals M1 and M2 are flat land portoins intervening between the grooves as shown in FIG. 2C, each having a length in the range from several $\mu$m to ten-odd $\mu$m detectable by the erasing beam. The mark signals are detected through a phase variation of the laser beam caused by the groove depth. The mark signals M1 and M2 have their land portions arranged in accordance with the track number, even or odd, as shown in FIG. 2C, and they are discriminated and detected by a difference in the amount of the laser beam reflected from the groove and flat portions. The data signal is recorded in the data field DF by the variable density type recording in which a laser beam is controlled to irradiate grooves, where a recording film is deposited by evaporation, so that a crystalline state thereof is changed to an amorphous state thereby to cause the reflectivity to be changed.

In order to effect the optical recording using the above-mentioned sector format, the optical head is designed to have mechanical precision so that the erasing light beam does not cause a track offset in excess of ±1 track. This allowance of ±1 track offset is considered to be a reasonable condition from a practical point of view.

In the case where the recording/reproduction light beam 23 is tracking an odd-numbered track shown in FIG. 1A, if the erasing light beam 24 is positioned on an even-numbered track shown in FIG. 1B, a reproduction signal produced by the erasing light beam 24 causes the mark signal M2 to be detected, while, if the erasing light beam 24 is positioned on an odd-numbered track, the mark signal M1 is detected. On the other hand, in the case where the recording/reproduction light beam 23 is tracking an even-numbered track, if the erasing light beam 24 is tracking the same even-numbered track, the erasing light beam 24 causes the mark signal M2 to be detected, while, if the erasing light beam 24 is positioned on an odd-numbered track, it causes the mark signal M1 to be detected. Accordingly, by detecting the mark signal M1 or M2 with the erasing light beam 24, on-tracking or off-tracking of the erasing light beam 24 can be determined.

In the example of FIGS. 2A, 2B and 2C, the data field is recorded in a groove. Alternatively, if the data field is recorded on a land, the mark signals M1 and M2 are formed as grooves.

Figure 3:
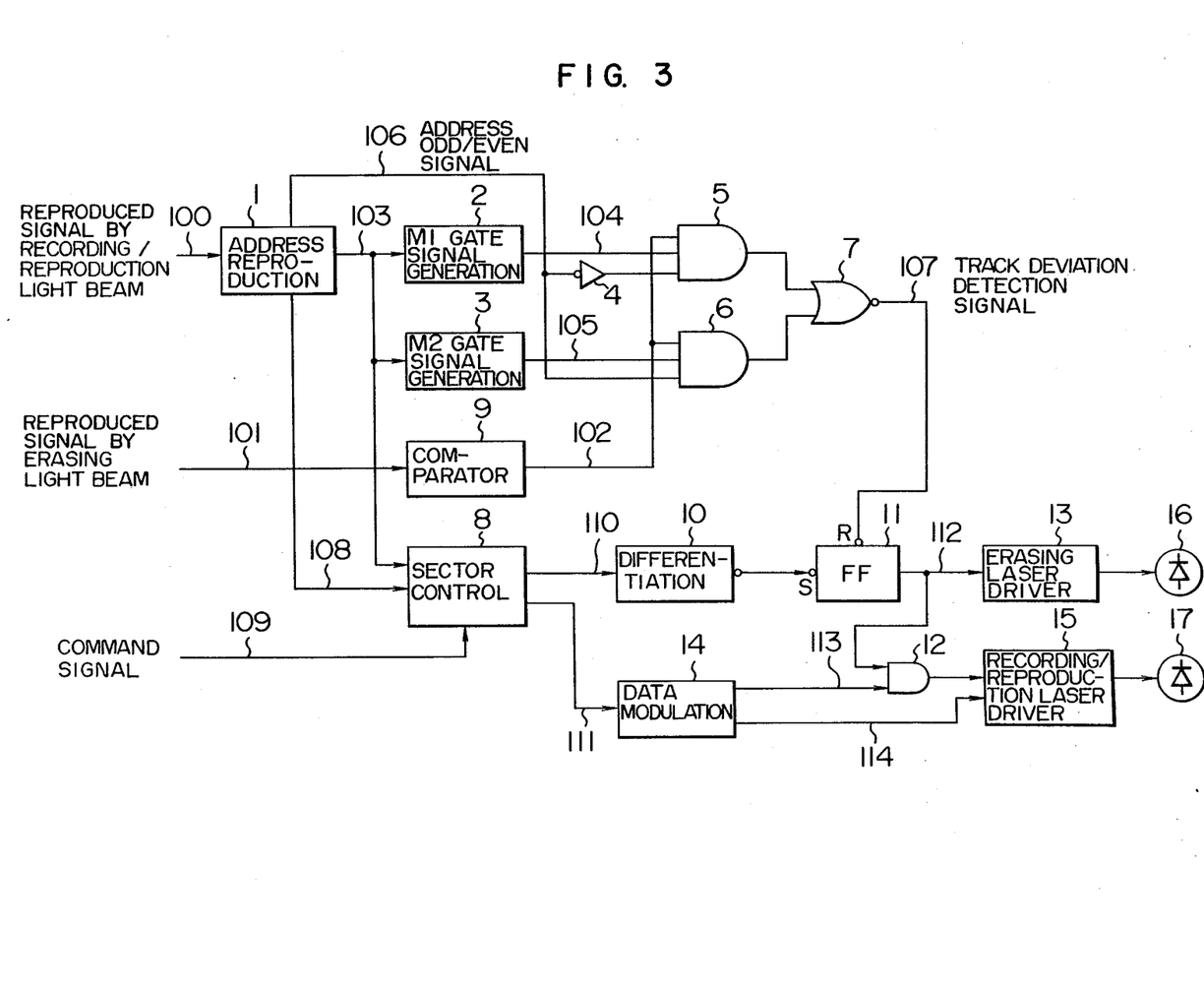
FIG. 3 is a block diagram showing the first embodiment of the optical information recording/reproduction apparatus using the optical disk of the present invention.

FIG. 3 is a block diagram showing a first embodiment of the optical information recording/reproduction apparatus using the optical disk of this invention. In the figure, indicated by 1 is an address reproduction circuit which reads out a track address and a sector address from the ID, 2 is an M1 gate signal generation circuit for producing a gate signal 104 for gating the mark signal M1, 3 is an M2 gate generation circuit for producing a gate signal 105 for gating the mark signal M2, 4 is an inverter, 5 and 6 are 3-input AND gates, 7 is a 2-input OR gate, 8 is a sector control circuit which generates a gate signal for erasing or recording data in an addressed sector, 9 is a comparator for converting an analog signal into a binary signal, 10 is a differentiation circuit for detecting a rising edge of a signal, 11 is a set-reset flip-flop, 12 is a 2-input AND gate, 13 is an erasing laser drive circuit, 14 is a data modulation circuit which produces write data 114 obtained by adding a clock resynchronizing pattern, a data section start mark, etc. to a digitally modulated signal obtained by digitally modulating data to which an error correction code has been added, 15 is a recording/reproduction laser drive circuit, 16 is an erasing laser source, 17 is a recording-/reproduction laser source, 100 is a signal reproduced from the optical disk by a recording/reproduction light beam 23 emitted from the recording/reproduction laser source 17, 101 is a signal reproduced from the optical disk by an erasing light beam 24 emitted from the erasing laser source 16, 102 is a binary representation of a signal reproduced by the erasing light beam 24, 103 is an address detection signal indicating that an address has been read out, 104 is an M1 gate signal for gating the mark signal M1, 105 is an M2 gate signal for gating the mark signal M2, 106 is an address odd/even signal indicating whether an associated track address is even or odd, 107 is a tracking deviation detection signal indicating the tracking deviation or aberrance of an erasing beam, 108 is an address data signal, 109 are command signals for erasing recording, reading and the like, 110 is an erasing gate signal for activating the erasing laser source 16, 111 is a modulation start signal, 112 is an enabling signal for activating the erasing laser drive circuit 13, 113 is a write gate signal indicating the validity of the write data 114 recorded in the data field, and 114 is the write data.

Figure 4:
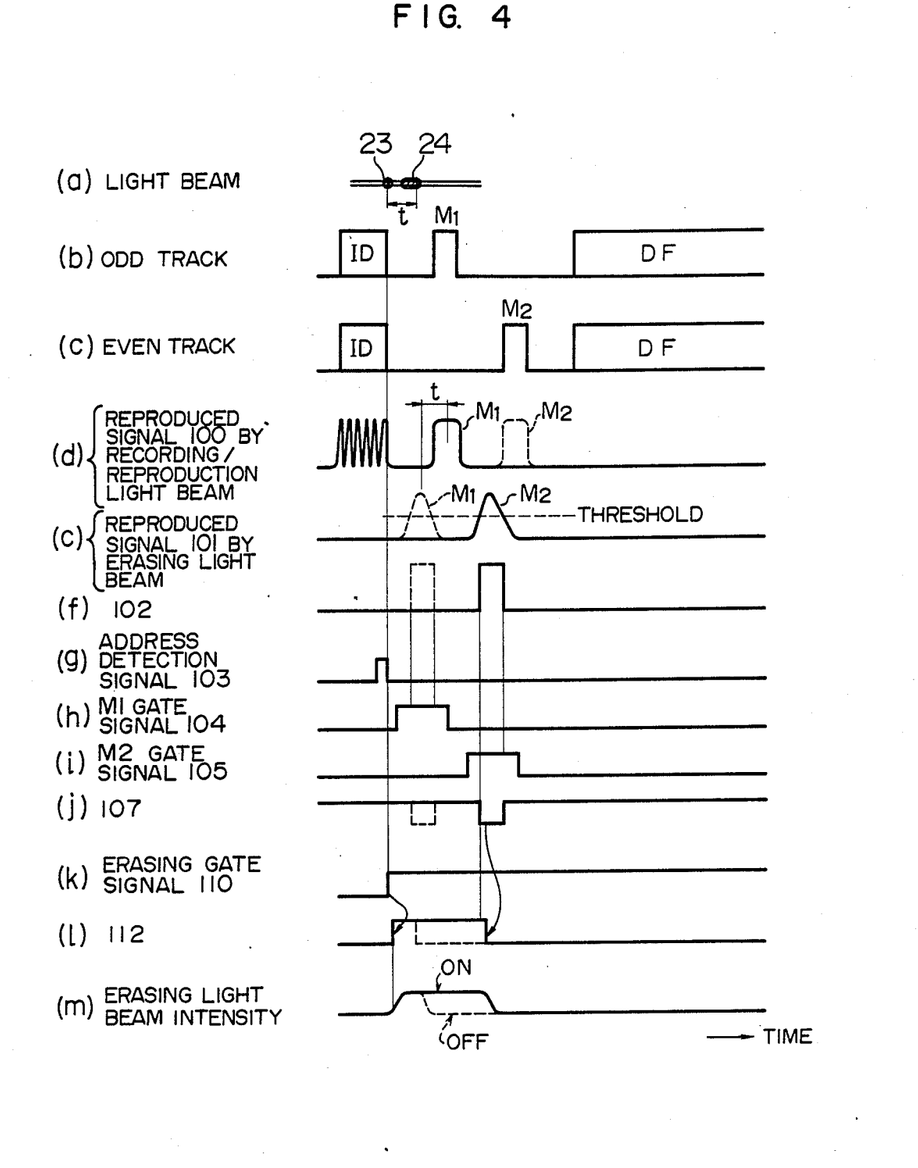
FIG. 4 is a waveform diagram showing the waveform of the signals into and from the various blocks in FIG. 3.

FIG. 4 shows signal waveforms appearing at various portions of the optical information recording/reproduction apparatus shown in FIG. 3. Shown in FIG. 4(a) is the positional relationship between the respective light spots of the recording/reproduction light beam 23 and the erasing light beam 24. In FIG. 4, waveforms shown by solid lines denote a case where the recording/reproduction light beam 23 is positioned on a track of an odd-numbered address as shown in FIG. 4(b) and the erasing light beam 24 is positioned on a track of an even-numbered address as shown in FIG. 4(c). While, waveforms shown by broken lines denote a case where the recording/reproduction light beam 23 is positioned on a track of an even-numbered address as shown in FIG. 4(c) and the erasing light beam 24 is positioned on a track of an odd-numbered address as shown in FIG. 4(b). The recording/reproduction light beam 23 and the erasing light beam 24 are apart from each other by time t as shown in FIG. 4(a). Therefore, the reproduced signal 101 by the erasing light beam 24 shown in FIG. 4(e) precedes the reproduced signal 100 by the recording/reproduction light beam 23 shown in FIG. 4(d) by time t.

The following describes the operation of the optical information recording/reproduction apparatus according to the first embodiment of this invention having the construction as described above. The operation is based on the assumption that the recording/reproduction light beam 23 is positioned on a track of an odd-numbered address as shown in FIG. 4(b) and the erasing light beam 24 now under tracking deviation or aberrance is positioned on a track of an even-numbered address.

The address reproduction circuit 1 reads an address in the ID in the reproduced signal 100 by the recording/reproduction light beam 23 and produces the address detection signal 103, address data 108 and address odd/even signal 106. The address data 108 and address detection signal 103 are applied to the sector control circuit 8. The sector control circuit 8 supplies the erasing gate signal 110 to the erasing laser drive circuit 13 and the modulation start signal 111 to the data modulation circuit 14 in accordance with the erasing/recording command indicated by the command signals 109.

The data modulation circuit 14 supplies the write data 114 and the write gate signal 113 to the recording/reproduction laser drive circuit 15 and the AND gate 12, respectively.

The differentiation circuit 10 detects a rising edge of the erasing gate signal 110 to set the flip-flop 11, which validates the erasing laser drive circuit enabling signal 112. Consequently, the erasing laser drive circuit 13 operates to turn on the erasing laser source 16 and causes it to start an erasing operation as shown in FIG. 4(m). As a result, the signal 101 shown in FIG. 4(e) is produced by an erasing light beam emitted from the erasing laser source 16.

The address detection signal 103 is supplied to the M1 gate signal generation circuit 2 and M2 gate signal generation circuit 3, which circuits 2 and 3 produce an M1 gate signal 104 and an M2 gate signal 105 shown in FIG. 4(h) and FIG. 4(i), respectively. The M1 gate signal 104 and the M2 gate signal 105 operate to detect that the erasing light beam 24 is positioned on an even-numbered track or an odd-numbered track by separating in time the mark signals M1 and M2 in the reproduced signal 101 by the erasing light beam 24.

The signal 101 shown in FIG. 4(e) reproduced from the optical disk by the erasing light beam 24 having a beam spot in the shape of an elongated ellipse has an inferior resolution as compared with that of the signal shown in FIG. 4(d) reproduced by the recording/reproduction light beam 23, so that it cannot reproduce the ID. However, it can satisfactorily reproduce the mark signals M1 and M2 formed as a land or a groove of several $\mu$m such as shown in FIGS. 2A to 2C. The reproduced signal 101 by the erasing light beam 24 is converted through the comparator 9 into a binary signal 102 at a predetermined threshold value, and the resulting binary reproduced signal 102 is supplied to the AND gates 5 and 6.

The address odd/even signal 106 is applied straightly to the AND gate 6, while, it is inverted through the inverter 4 and applied to the AND gate 5. The AND gates 5 and 6 and a NOR gate 7 in combination operate to select the mark signal M1 or M2 in the binary reproduced signal 102. The address odd/even signal 106 presently indicates an odd track, and therefore the AND gate 6 is selected, and the tracking deviation detection signal 107 corresponding to the mark signal M2 is produced as shown in FIG. 4(j). The tracking deviation detection signal 107 resets the flip-flop 11 thereby to invalidate the erasing laser drive circuit enabling signal 112. Consequently, the erasing laser source 16 is turned off as shown in FIG. 4(m). The data recording operation is also interrupted by blocking a write gate signal 113 through the AND gate 12.

The signal waveforms appearing when the recording/reproduction light beam 23 is positioned on an even-numbered track is shown by the broken lines in FIG. 4, and they are identical with those in the above-mentioned case except that the AND gate 5 is selected by the address odd/even signal 106 thereby to detect the mark signal M1.

According to this embodiment, as described above, the mark signal M1 or M2 immediately behind the ID is identified depending on the odd or even number of the address of the track at the timing of generation of the M1 or M2 gate signal caused by the address detection signal 103, which is outputted from the address reproduction circuit 1, whereby erroneous erasing and recording can be prevented even when ±1 track deviation of the erasing light beam from the recording/reproduction light beam occurs.

Figure 5:
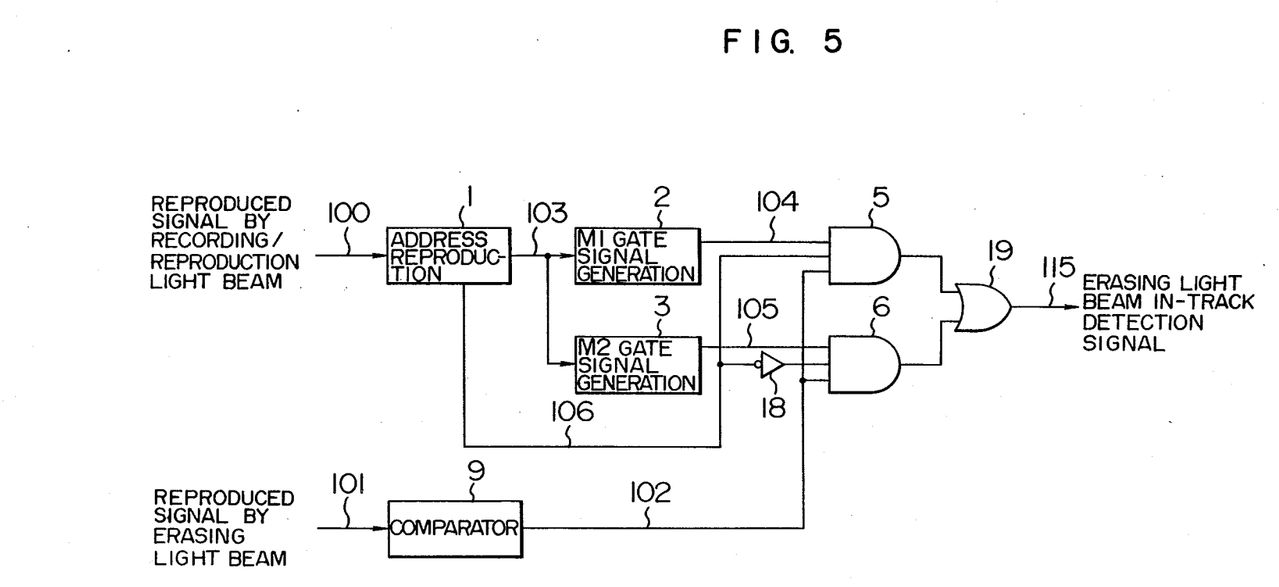
FIG. 5 is a block diagram showing the second embodiment of the optical information recording/reproduction apparatus using the optical disk of the present invention.

FIG. 5 is a block diagram showing a second embodiment of the optical information recording/reproduction apparatus using the optical disk of the present invention. In the figure, circuit blocks and signals identical with those shown in FIG. 3 are denoted by the same reference numerals and symbols. In FIG. 5, indicated by 18 is an inverter, 19 is an OR gate, and 115 is an erasing light beam in-track detection signal indicating that the erasing light beam 24 is positioned on the same track with the recording/reproduction light beam 23.

The following describes the operation of the optical information recording/reproduction apparatus according to the second embodiment of this invention having the construction as described above. The explanation is based on the assumption that the erasing light beam 24 is positioned on the same odd address track with the recording/reproduction light beam 23.

The address reproduction circuit 1 reads an address in the ID in the reproduced signal 100 by the recording/reproduction light beam 23 and produces an address detection signal 103 and an address odd/even signal 106. The address detection signal 103 is applied to the M1 gate generation circuit 2 and the M2 gate generation circuit 3, which circuits 2 and 3 produce an M1 gate signal 104 and an M2 gate signal 105, respectively.

The reproduced signal 101 by the erasing light beam 24 reproduces a mark signal M1. The reproduced signal 101 is converted through the comparator 9 into a binary signal 102 at a predetermined threshold value, and it is supplied to the AND gates 5 and 6 as a binary reproduced signal 102 by the erasing light beam 24. The address odd/even signal 106 becomes a high level, which causes the AND gate 5 and the OR gate 19 to produce the mark signal M1 of the binary reproduced signal 102 by the erasing light beam 24 as an erasing light beam in-track detection signal 115. On the other hand, when the erasing light beam 24 is positioned on the same even address track with the recording/reproduction light beam 23, the address odd/even signal 106 is a low level, and then it is inverted through the inverter 18, which inverted signal causes the AND gate 6 and the OR gate 19 to produce the mark signal M2 of the binary reproduced signal 102 by the erasing light beam 24 as an erasing light beam in-track detection signal 115.

Next, an explanation will be given of the operation of the apparatus of the present invention in which the erasing light beam 24 is positioned on a track deviated by ±1 track from a track on which the recording/reproduction light beam 23 is positioned. The reproduced signal 101 by the light erasing beam 24 produces a mark signal M2 when the recording/reproduction light beam 23 is positioned on an odd address track, while, it produces a mark signal M1 when the recording/reproduction light beam 23 is positioned on an even address track. Therefore, the AND gates 5 and 6 operate to block the binary reproduced signal 102 by the erasing light beam 24 in any case, and, as a result, an erasing light beam intrack detection signal 115 is not detected. Thus, by monitoring the erasing light beam in-track detection signal 115 with a CPU or the like, it is possible to detect the coexistence of the erasing light beam 24 and the recording/reproduction light beam 23 on the same track.

As described above, according to this embodiment, it is possible to confirm that the erasing light beam 24 and the recording/reproduction light beam 23 are positioned on the same track, by identifying the mark signal M1 or M2 immediately behind the ID depending on the odd or even number of the address of the track at the timing of generation of the M1 or M2 gate signal caused by the address detection signal 103, which is outputted from the address reproduction circuit 1.

Figure 6:
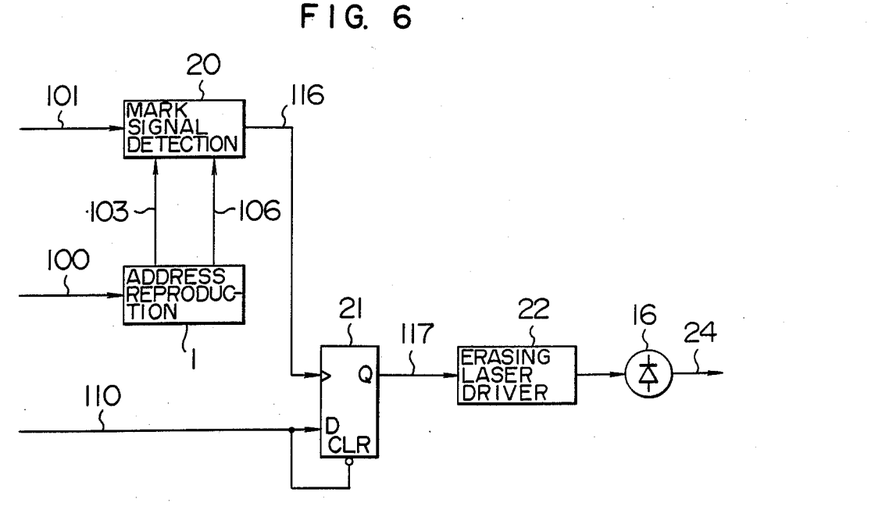
FIG. 6 is a block diagram showing the third embodiment of the optical information recording/reproduction apparatus.

FIG. 6 is a block diagram showing a third embodiment of the optical information recording/reproduction apparatus of the present invention. In the figure, reference numerals 1, 16, 100, 101, 103, 106 and 110 denote the same constitutional elements and signals shown in FIG. 3. Indicated by 20 is a mark signal detection circuit, 21 is a D-input type flip-flop, 22 is an erasing laser drive circuit, 16 is an erasing laser source, 116 is a mark signal detection signal, and 117 is an output signal from the D-FF 21.

Figure 7:
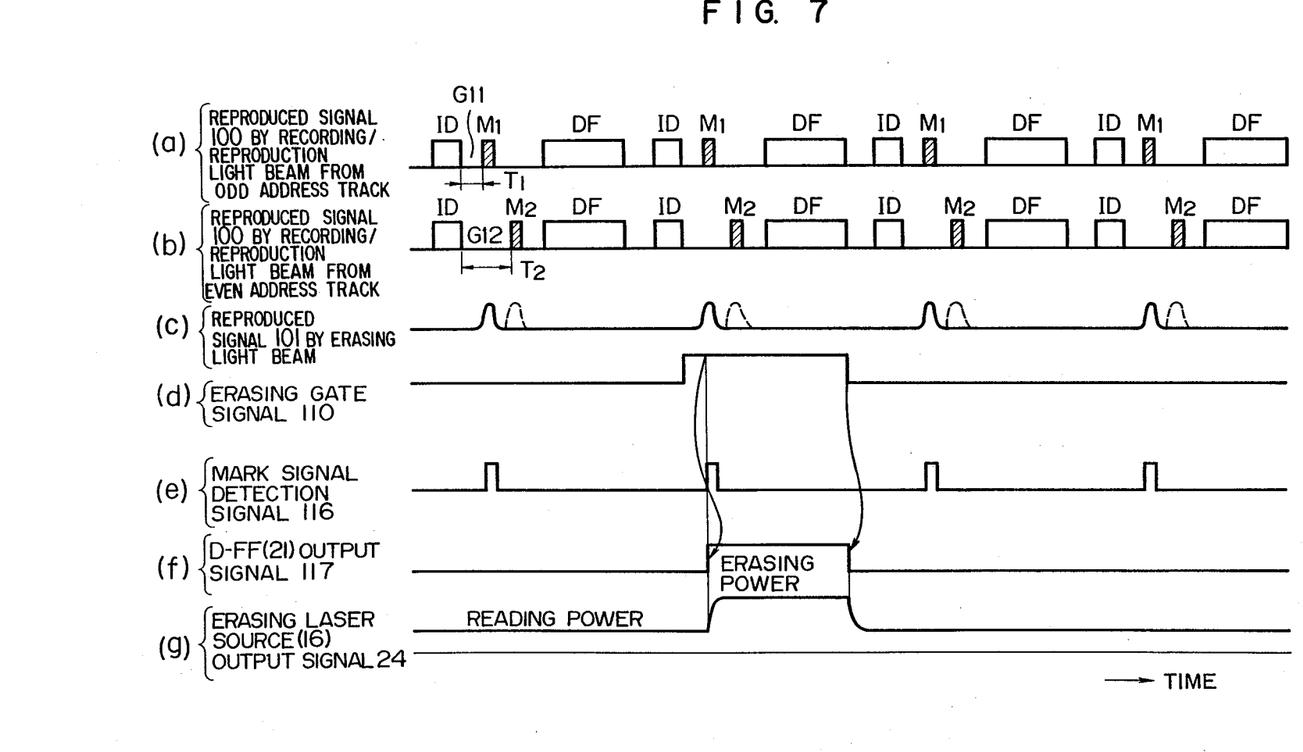
FIG. 7, consisting of (a)-(g), is a waveform diagram showing the waveform of the signals into and from the various blocks in FIG. 6.

FIG. 7 shows signal waveforms appearing at various portions of the optical information recording/reproduction apparatus shown in FIG. 6 for explaining the operation thereof. FIGS. 7(a) and FIG. 7(b) show reproduced signals 100 reproduced from an odd address track and an even address track by the recording/reproduction light beam 23, respectively. FIG. 7(c) shows a reproduced signal 101 reproduced by the erasing light beam 24. FIG. 7(d) shows an erasing gate signal 110, FIG. 7(e) a mark signal detection signal 116, FIG. 7(f) an output signal 117 from the D-FF 21, and FIG. 7(g) an erasing light beam output signal 24 from the erasing laser source 16.

The following explains the operation of the optical information recording/reproduction apparatus of the third embodiment of the present invention having the construction as described above.

As an example, the following explanation assumes a case where the recording/reproduction light beam 23 is positioned on an odd address track as shown in FIG. 7(a).

The erasing laser source 16 is operating continuously at a reproduction power level. When the erasing light beam 24 is positioned on an odd address track on the optical disk, the reproduced signal 101 reproduced from the odd address track by the erasing light beam 24 is applied to the mark signal detection circuit 20, which then outputs a mark signal M1 as the mark signal detection signal 116.

The mark signal detection signal 116 operates to latch the erasing gate signal 110 in the D-FF 21 to actuate the erasing laser drive circuit 22, which then supplies an erasing power output current to the erasing laser source 16 to cause it so to produce a laser beam of the erasing power level so that the data field DF is erased over the period shown in FIG. 7(g).

If the erasing light beam 24 is positioned on an even address track as shown by the broken line waveform in FIG. 7(c), the reproduced signal 101 reproduced by the erasing light beam 24 reproduces the mark signal M2, and therefore the mark signal detection circuit 20 does not produce the mark signal detection signal 116. Accordingly, the erasing laser drive circuit 22 is not actuated to produce an erasing power level output signal, even if the erasing gate signal 110 is applied to the D-FF 21. Thus, erroneous erasing of the even address track can be prevented.

According to this third embodiment, the mark signal M1 or M2 immediately behind the ID is respectively identified depending on an odd or even address of the track, at the timing of generation of the M1 or M2 gate signal caused by the address detection signal 103 which is outputted from the address reproduction circuit 1, whereby it becomes possible to prevent erroneous erasing or recording which occurs when the tracking of the erasing light beam 24 deviates by ±1 track from that of the recording/reproduction light beam 23. It is of course possible to use the mark signals M1 and M2 of this embodiment as a mirror section so that it is used commonly with the TOF (tracking offset detection flag) for correcting an inclination of the optical disk.

As described above, the present invention has a great practical advantage of being capable of detecting the tracking deviation of the erasing light beam and preventing erroneous erasing caused by the tracking deviation.

What is claimed is:

1. An optical information recording/reproduction apparatus for recording and reproducing information on a sector basis, characterized by comprising:
light beam sources for respectively projecting a recording/reproduction light beam and an erasing light beam which precedes said recording/reproduction light beam;
drive means for driving said light beam sources, respectively; and
mark signal detecting means for detecting a track position identification mark signal disposed between a sector identifier and a data field in said sector;

wherein said mark signal detecting means detects said track position identification mark signal so as to determine that said erasing light beam is not positioned on the same track with said recording/reproduction light beam and to control said drive means, thereby preventing data recorded in said data field from being erased by said erasing light beam.

2. An optical information recording/reproduction apparatus according to claim 1 characterized in that said mark signal detecting means detects said track position identification mark signal by using said erasing light beam of a reproducing output power level.

3. An optical information recording/reproduction apparatus characterized by comprising:

light beam sources for projecting a recording/reproduction light beam and an erasing light beam, which precedes said recording/reproduction light beamd, onto an optical disk on and from which information is recorded and reproduced, respectively, on a sector basis;

drive means for driving said light beam sources, respectively;

address information reproducing means for reproducing address information in said sector by using said recording/reproduction light beam;

mark signal detecting means for detecting a track position identification mark signal in said sector by using said erasing light beam; and comparing means for making a comparison between a first output signal from said address information reproducing means and a second output signal from said mark signal detecting means;

whereby said drive means are controlled by an output signal from said comparing means.

4. An optical information recording/reproduction apparatus according to claim 3 characterized in that said mark signal detecting means detects said track position identification mark by using said erasing light beam of a reproducing output power level.

5. An optical information recording/reproduction apparatus for recording and reproducing information on a sector basis, characterized by comprising:

means for projecting an erasing laser beam and a recording/reproduction laser beam;

recording and reproducing means for recording and reproducing information by using said recording/reproduction laser beam;

erasing means for erasing recorded information by using said erasing laser beam;

erasing laser drive means for switching the output power level of said erasing laser beam between a reproducing output power level and an erasing output power level; and reproducing means using said erasing laser beam for reproducing a track position identification mark signal disposed between a sector identifier and a data field in said sector;

whereby the reproduction of said track position identification mark signal by said reproducing means using said erasing laser beam makes it possible to detect that said erasing laser beam and said recording/reproduction laser beam are positioned on the same track, so that said erasing laser drive means causes said erasing lasedr beam projecting means to emit a laser beam of an erasing power level capable of erasing data recorded in said data field.

6. An optical information recording/reproduction apparatus for recording and reproducing information on a sector basis, characterized by comprising:

means for projecting an erasing laser beam and a recording/reproduction laser beam;

recording and reproducing means for recording and reproducing information by using said recording/reproduction laser beam;

erasing means for erasing recorded information by using said erasing laser beam;

erasing laser drive means for switching the output power level of said erasing laser beam between a reproducing output power level and an erasing output power level; and reproducing means using said erasing laser beam for reproducing a track position identification mark signal disposed between a sector identifier and a data field in said sector;

whereby the reproduction of said track position identification mark signal by said reproducing means using said erasing laser beam makes it possible to detect that said erasing laser beam and said recording/reproduction laser beam are not positioned on the same track, so that said erasing laser drive means prohibits the emission of a laser beam of an erasing power level from said erasing laser beam projecting means.

* * * * *